United States Patent
Bondi et al.

(10) Patent No.: US 6,173,410 B1
(45) Date of Patent: *Jan. 9, 2001

(54) MICROPROCESSOR CIRCUITS, SYSTEMS AND METHODS FOR CONDITIONING INFORMATION PREFETCHING BASED ON RESOURCE BURDEN

(75) Inventors: James O. Bondi; Jonathan H. Shiell, both of Plano, TX (US)

(73) Assignee: Texas Instruments Incorporated, Dallas, TX (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/915,619

(22) Filed: Aug. 21, 1997

Related U.S. Application Data (60) Provisional application No. 60/024,257, filed on Aug. 21, 1996, now abandoned.

(51) Int. Cl.[7] ..................................................... G06F 9/38
(52) U.S. Cl. ........................... 713/324; 713/340; 712/207
(58) Field of Search .................. 364/707; 395/280–312, 395/383, 750.03, 750.06, 750.08; 711/137, 204, 213; 713/320, 321, 322, 323, 324, 340; 712/207

(56) References Cited

U.S. PATENT DOCUMENTS

| | | | | |
|---|---|---|---|---|
| 5,579,493 | * | 11/1996 | Kiuchi et al. | 712/207 |
| 5,590,342 | * | 12/1996 | Marisetty | 713/324 |
| 5,630,145 | * | 5/1997 | Chen | 713/322 |
| 5,719,800 | * | 2/1998 | Mittal et al. | 713/321 |
| 5,761,715 | * | 6/1998 | Takahashi | 711/128 |
| 5,790,810 | * | 8/1998 | Kada | 710/104 |
| 5,832,285 | * | 11/1998 | Shimada | 713/323 |
| 5,838,929 | * | 11/1998 | Tanikawa | 710/102 |

\* cited by examiner

Primary Examiner—William M. Treat
(74) Attorney, Agent, or Firm—Wade James Brady, III; Frederick J. Telecky, Jr.

(57) ABSTRACT

In a computer system (10) embodiment, there is included a memory (18) and circuitry (16a) for prefetching information from the memory in response to a prefetch request. The system further includes a system resource (14), wherein the system resource is burdened in response to a prefetch operation by the circuitry for prefetching information. The system resource is also further burdened in response to other circuitry (16b, 16n, 17) using the system resource. The system further includes circuitry (20, 22, 24) for determining a measure of the burden on the system resource. Lastly, the system includes circuitry (26) for prohibiting prefetching of the information by the circuitry for prefetching information responsive to a comparison of the measure of the burden with a threshold. Other circuits, systems, and methods are also disclosed and claimed.

13 Claims, 5 Drawing Sheets

MICROPROCESSOR CIRCUITS, SYSTEMS AND METHODS FOR CONDITIONING INFORMATION PREFETCHING BASED ON RESOURCE BURDEN

This application claims priority under 35 USC 119 (e)(1) of the provisional application 60/024,257, filed Aug. 21, 1996, now abandoned.

TECHNICAL FIELD OF THE INVENTION

The present embodiments relate to microprocessor systems, and are more particularly directed to microprocessor circuits, systems, and methods for conditioning information prefetching based on a resource burden of the system.

BACKGROUND OF THE INVENTION

The present embodiments relate to the ever-expanding field of computer systems, and may apply in various instances to both single and multiple microprocessor-based systems. As all of these types of systems advance, designers strive to increase performance while minimizing costs. Indeed, significant advances have been made in the design of microprocessors to improve their performance, as measured by the number of operations performed over a given time period.

One advancement in microprocessor operation relates to the concept of prefetching information. Prefetched information may be either data or instructions. As is known in the art, a block of information is often prefetched from some storage device which is at a relatively high order in the memory hierarchy, such as a memory which is external from the integrated circuit which includes the microprocessor. In a multiple microprocessor system, a common external memory may be accessed by prefetches performed by each microprocessor in the system. In any event, once information is prefetched, it is commonly written to a storage device lower in the storage hierarchy, such as in a lower order cache or the like. Prefetching in either of the above manners provides the benefit of allowing the time spent to retrieve such information to occur concurrent with other actions of the microprocessor so that once the prefetched information is actually used by the microprocessor there is either a reduced or no delay in then having to fetch the information; thus, prefetching reduces or eliminates some of the cache miss penalty by having such a miss occur during other processing.

The event triggering prefetching is often some type of speculative activity which suggests that the information is likely to be needed for subsequent operations. Numerous types of prefetching are known in the art. Without an exhaustive listing, however, some examples are illustrative. One type of prefetching often occurs where an instruction fetch unit in an instruction pipeline fetches a group of instructions. Particularly, the instruction fetch unit may perform a prefetch in response to an indication in a branch target buffer or the like. In this instance, the branch target buffer predicts (i.e., speculates) that an information unit at a branch target address will be needed by the microprocessor and, therefore, this speculative information unit is prefetched. Another type of prefetching often occurs where an instruction fetch unit in an instruction pipeline prefetches blocks of data in response to a load target buffer. As known in the art, a load target buffer predicts loads and stores based on past data cache misses. Therefore, it is beneficial to prefetch one or more information units which may not already be in the cache as predicted in this manner. Still another type of prefetching occurs for certain instructions, such as those involved with certain block or string-related operations. Specifically, for such operations, it is often known that the string at issue will include numerous words (or some other quantity such as a double-word), yet the microprocessor may be able to handle only one word (or other quantity) at a time. In this instance, the microprocessor will initially fetch the first word of the string, yet will concurrently commence a prefetch of some or all of the remaining words of the string so that those remaining words are more readily accessible for processing after the first word is fetched. Still other examples of operations which induce a prefetch operation are also known in the art so that, while the system is processing an instruction, separate circuitry concurrently prefetches a block of information with the expectation that such information will be needed by operations following the current instruction. Consequently, if indeed additional instructions then require the prefetched information, it is accessible from the lower order storage device rather than having to then retrieve it from a higher level storage device and incurring the potentially large number of clock cycles needed to perform such a retrieval.

While prefetching according to the manners above as well as known in the art may therefore improve performance, the present inventors have recognized various drawbacks resulting from such techniques. Thus, below is provided a discussion of some of such drawbacks as well as various embodiments which reduce the effects of such drawbacks and, therefore, improve upon the prior art.

SUMMARY OF THE INVENTION

In a computer system embodiment, there is included a memory and circuitry for prefetching information from the memory in response to a prefetch request. The system further includes a system resource, wherein the system resource is burdened in response to a prefetch operation by the circuitry for prefetching information. The system resource is also further burdened in response to other circuitry using the system resource. The system further includes circuitry for determining a measure of the burden on the system resource. Lastly, the system includes circuitry for prohibiting prefetching of the information by the circuitry for prefetching information in response to a comparison of the measure of the burden with a threshold. Other circuits, systems, and methods are also disclosed and claimed.

DETAILED DESCRIPTION OF THE PREFERRED EMBODIMENTS

Figure 1:
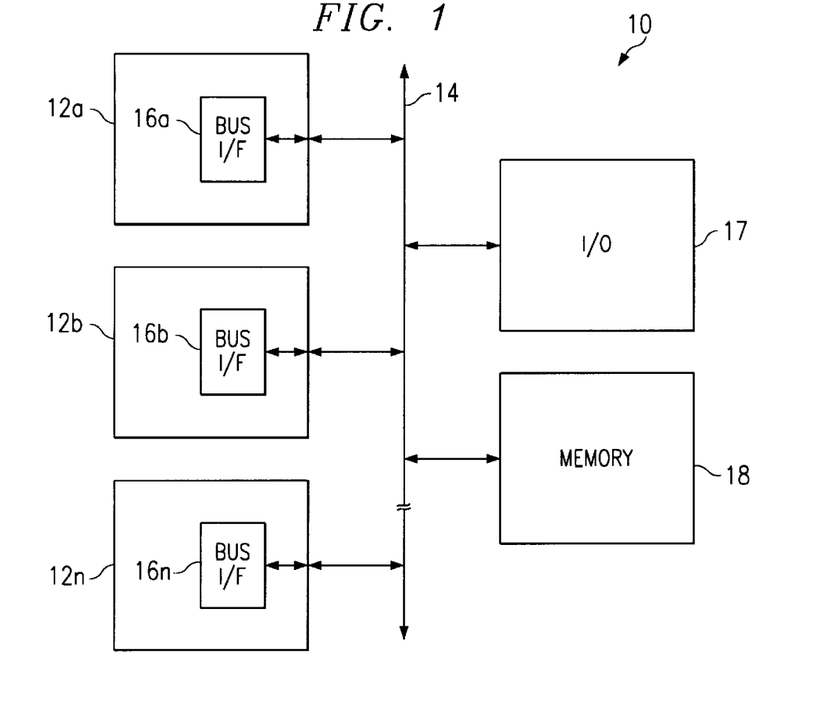
FIG. 1 illustrates a block diagram of a multiple microprocessor system, where each microprocessor may burden a common bus to read information from, and write information to, a memory.

FIG. 1 illustrates a multiple microprocessor system designated generally at 10 and in accordance with the present embodiments. System 10 includes several microprocessors, designated 12a, 12b, and 12n, respectively, with it understood by the illustration as well as the numbering that any number of microprocessors may be included in such a system. Note for purposes of the present embodiments that microprocessors 12a, 12b, and 12n may be constructed on a single integrated circuit or, as an alternative embodiment, each such microprocessor may be constructed on an integrated circuit separate from the other microprocessor(s). In all events, each microprocessor is connected to a bus 14; more specifically, each microprocessor 12a, 12b, and 12n preferably includes a corresponding bus interface 16a, 16b, and 16n (abbreviated as "BUS I/F" on FIG. 1) connecting the microprocessor to bus 14. Each bus interface 16a, 16b, and 16n allows its corresponding microprocessor to communicate information to and from bus 14, and performs various control operations described below. An input/output circuit 17 (abbreviated "I/O" on FIG. 1) is also included in system 10 to generally depict other circuitry which may access bus 14 for reasons clearer below. I/O circuit 17 could include any type of circuitry operable to transact along bus 14. Lastly, bus 14 is connected to a memory 18 which is external from each of the multiple microprocessors. Without additional detail, the discussion to this point of FIG. 1 does not differ from that known in the prior art; however, the discussion below further details the prefetching problems recognized by the present inventors and includes specifics of circuits and functionality which are included to improve upon the prior art.

The configuration of system 10 permits each microprocessor as well as I/O circuit 17 to either write information to, or read information from, memory 18 along a common bus, namely, bus 14. The present inventors, however, recognize various problems arising in the context of prefetching given the common bus configuration and which are demonstrated here by way of example. Recall from the Background above that prefetching is often induced to retrieve information under the speculation that such information will be used in the near future by the microprocessor prefetching such information. For example, assume that microprocessor 12a processes a string instruction which requires processing of numerous bytes of string data. Thus, if microprocessor 12a uses prefetching, it will attempt to prefetch a block of the string data. Assuming the block of data is not located within the microprocessor (e.g., on an on-hip cache), then microprocessor 12a will prefetch the block of string data from memory 18, via bus 14.

While in some instances the above-described prefetch operation may benefit microprocessor 12a, it also poses potential drawbacks to system 10 as a whole. More particularly, the common bus allows prefetching, but also may heavily burden bus 14 due to excessive prefetching among other reasons. While this burden may be acceptable in various instances, it creates a considerable drawback when ultimately the prefetched information is not even used by the prefetching microprocessor. For example, the prefetching microprocessor may instead incur some change in program control, such as a jump or exception elsewhere, in which case the prefetched information is not used. As another example, recall that prefetched information is speculatively retrieved and, therefore, it may ultimately be determined that the speculation was inaccurate and, therefore, either part or all of the prefetched information is not needed by the prefetching microprocessor. In either event, therefore, bus 14 has been burdened by the prefetch operation yet the prefetched information ultimately was unnecessary. In view of the above, the present inventors provide below various embodiments to address these as well as other inefficiencies which may be appreciated by a person skilled in the art.

To better appreciate the various inventive embodiments described below, a few additional points are set forth by way of introduction to the burden which may occur due to a shared bus configuration such as in FIG. 1. First, as noted above, prefetching by a circuit along the bus will burden the bus. Second, note that bus 14 may be burdened due to prefetching in this manner, and may be further burdened simply by the various circuits of FIG. 1 communicating with one another along bus 14 for reasons other than prefetching. Third, either prefetching or non-prefetching burden may exist for both synchronous and asynchronous bus transactions, each of which is described below. For a synchronous bus transaction, if microprocessor 12a uses bus 14 for an access, then bus 14 is exclusively dedicated to the microprocessor 12a transaction during a continuous time from the beginning to the end of the bus transaction. Consequently, if microprocessor 12a is prefetching using bus 14, microprocessors 12b and 12n as well as I/O circuit 17 (and any other similarly coupled microprocessors or circuits sharing bus 14) cannot access memory 18 via bus 14 during that bus transaction. Therefore, if the prefetching is frequent, its benefit may not be worthwhile because other circuits are at that time foreclosed from transacting along bus 14. For an asynchronous bus transaction, transactions along bus 14 may be through the use of "split" transaction cycles. An asynchronous bus transaction refers to a transaction in which a bus request is made in one bus cycle, and in which one or more responses to the bus request are made in later bus cycles that are not contiguous in time to the request. For example, an asynchronous bus transaction request may be made by microprocessor 12a in a first bus cycle, followed by bus cycles of a different type which may be accesses to bus 14 by either microprocessor 12b or 12n, or I/O circuit 17, in later cycles, which are then followed by responses to the asynchronous bus transaction request of microprocessor 12a in the first bus cycle. Such split bus transactions require identifying information, through the use of address or control signals, in order for the system to recognize and properly respond to the bus activity in any one of the bus cycles. For more information on such systems, the reader is invited to review U.S. Provisional Patent Application Ser. No. 60/009,318, entitled "Microprocessor System With Capability For Asynchronous Bus Transactions", filed Dec. 29, 1995, and which is hereby incorporated herein by reference. Given the above, therefore, if microprocessor 12a is prefetching using bus 14 in an asynchronous bus transaction system, additional complex control and expended time may be necessary as two or more circuits access or seek access to bus 14, again possibly creating inefficiencies due to frequent prefetching using bus 14.

Figure 2:
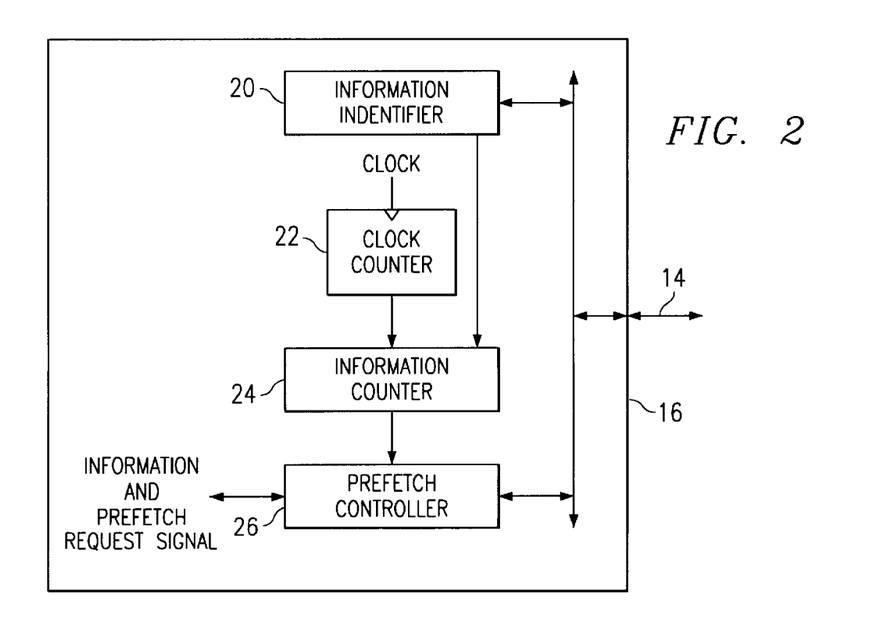
FIG. 2 illustrates a block diagram of various circuits within a bus interface circuit of one or more of the microprocessors of FIG. 1.

Having set forth the above introductory comments, FIG. 2 illustrates a block diagram of various components of a bus interface which may be used in one or more of the microprocessors of FIG. 1. Because the bus interface can be used in any of those microprocessors, it is generally designated at 16, with it understood that it may be used as bus interface 16a, 16b, or 16n in FIG. 1. Before proceeding, note various aspects regarding the illustration of FIG. 2. First, the blocks shown in FIG. 2 are only included to demonstrate various functionality of the present embodiments and a person skilled in the art will recognize various alternatives to grouping and/or performing such functionality. Second, any bus interface such as bus interface 16 will necessarily include considerable other circuitry to perform bus interfacing functionality, with such other circuits known in the art and not discussed here in order to simplify the discussion to the present embodiments.

Bus interface 16 includes an information identifier 20 coupled to bus 14. As appreciated in greater detail below, information identifier 20 operates to determine, for each bus clock cycle, whether an information unit is present on bus 14. In other words, bus 14 by definition will operate to communicate some number of bits. This quantity of information in its entirety is referred to in this document as an information unit. For example, a typical unit of this sort is often on the order of 16, 32, or 64 bits wide. Moreover, the information unit may represent data, an instruction, and/or some type of control signal such as is required for bus arbitration. In all events, at any given time, bus 14 may be communicating an information unit between any of the circuits coupled to the bus. When an information unit is present on bus 14, information identifier 20 detects its presence and asserts a control signal at its output. Note further that in some embodiments information identifier 20 may further discern the type of information, if any, on bus 14. For example, information identifier 20 may detect various different circuits using bus 14 for continuous clock cycles in the example of an asynchronous bus transaction as introduced above. As another example, information identifier 20 may detect which bus transactions represent prefetch activity by other circuits having access to bus 14. In this latter instance, and for reasons more clear below, the control signal output by information identifier 20 is not asserted when such prefetch type information is being communicated on bus 14, whereas for other types of detected information the control signal is asserted. The reasons for such alternative actions are discussed later.

Bus interface 16 further includes a clock counter 22 which is coupled to receive a waveform synchronous to the clock signal for bus 14. Given this input, clock counter 22 operates to count each successive clock cycle up to a fixed number. For example, clock counter 22 may be configured to count fifty successive clock cycles of bus 14, and then resets to count the next fifty clock cycles and so forth. In addition, clock counter 22 outputs a control signal which is asserted each time the counter reaches its given fixed count number (e.g., fifty).

Bus interface 16 still further includes an information counter 24 which receives one control signal from information identifier 20, and also receives another control signal output by clock counter 22. Information counter 24 may be constructed in various configurations, and a more straightforward variant is first presented to simplify the following discussion. Thus, given its inputs, information counter 24 operates to count how many information units (as detected and indicated by information identifier 20) are present on bus 14 over the amount of time as established by the fixed number attributed to clock counter 22. Recall from the above that an example is provided where clock counter 22 repeatedly counts to fifty, and asserts its control output signal when reaching that limit. Continuing with this example, therefore, between assertions of the control signal from clock counter 22, information counter 24 counts information units detected by information identifier 20, that is, those information units for which information identifier 20 asserts its output control signal. Since bus 14 can communicate only one information unit per clock cycle, then at the end of a given period of time, clock counter 22 asserts its control output signal and information counter 24 will have counted somewhere between zero and fifty information units. Given the availability of this count, one skilled in the art will appreciate that such a count reflects how busy bus 14 is for a preceding period of fifty counts (corresponding to the previous fifty clock cycles). In other words, at the end of such a period, the larger the number of counts, the more busy bus 14 has been over that period; conversely, the lower the number of counts, the less busy bus 14 has been over that period. Thus, the number of counts provided by information counter 24 is a manner of indicating a burden on a system resource, with the burden in the present example being the frequency of use and the system resource being bus 14. Recall also that information identifier 20 may be configured to not assert its control output signal for certain types of detected information units. Therefore, by excluding certain types of information units in this manner, those information units, even though transacted on bus 14, will not contribute to the count and therefore are not reflected as part of the bus burden as determined by circuit 16. In all events, once a count indicating burden is provided, it is used in a manner appreciated by the additional Figures discussed below.

As mentioned above, a single count of zero to fifty information units represents a less complex embodiment for information counter 24. In an alternative embodiment, however, information counter 24 preferably includes six separate counters, with each counter operable to count between zero and ten information units. In this alternative embodiment, a rolling count is established so that a first counter is used for a given ten clock cycles, followed by a second counter, and so forth. Once five sets of counts are accumulated, the total of those five counts is determined to provide an indication of the burden on bus 14. In addition, once a sixth set of counts is accumulated, the oldest set of counts (i.e., the first count set in the present example) is discarded, such as by overwriting it with the next successive count. Given that the oldest set of counts is to be discarded, the five most recent sets of counts are summed. Thus, for each fifty cycles thereafter the five most recent counts may be summed to provide a better indication of the recent burden on bus 14.

Lastly, bus interface 16 includes a prefetch controller 26. In part, prefetch controller 26 includes known circuitry for permitting a prefetch of a block of information using bus 14. Thus, prefetch controller 26 is connected to receive a prefetch request signal from the remainder of the microprocessor which includes bus interface circuit 16. As mentioned earlier, such a request may arise in response to a certain type of instruction, such as an instruction indicating a string operation. Other prefetch inducing events are known in the art. To respond to such a request, prefetch controller 26 is further connected to bus 14 to prefetch information and return it to the microprocessor including bus interface 16. In addition to known circuitry, however, prefetch controller 26 is also connected to information counter 24 in order to evaluate the bus burden (e.g., count) provided by information counter 24. More specifically, and as detailed below, based on the bus burden, prefetch controller 26 may prohibit a prefetch from occurring even though prefetch controller 26 has received a request to perform such a prefetch. This prohibition may be temporary, or permanent, also based on various alternatives and considerations set forth below.

Figure 3A:
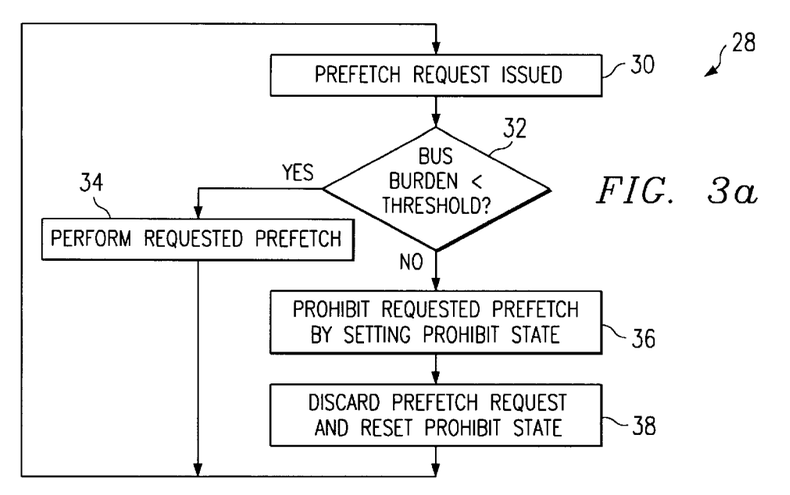
FIG. 3a illustrates a method of operation of one or more of the microprocessors of FIG. 1 to selectively permit or prohibit prefetching based on the burden of the memory bus.

FIG. 3a illustrates a flowchart of a method of operation of one or more of microprocessors 12a, 12b, and 12n of FIG. 1 and, more particularly, is primarily directed to bus interface 16 of FIG. 2 (which again, may be included in any one or more of such microprocessors). The method is designated generally at 28. Method 28 begins with a step 30, where a prefetch request is issued by a microprocessor 16. At this point, assume for the sake of example that such a request is in response to a string operation as mentioned above, with other examples ascertainable by a person skilled in the art. Note also that the request may arise from a request recently issued or, alternatively, from a prefetch request which was issued but stored into some storage device such as a request queue and which is now ready to otherwise cause a prefetch operation. In any event, next step 32 compares the burden of bus 14 to a threshold available to microprocessor 16. In the preferred embodiment, this threshold is stored within a register or the like, and which may be included in prefetch controller 26. In one embodiment, the threshold is preferably set at approximately sixty-six percent of full bus capacity. For example, where the bus burden is represented by a count of zero to fifty, then a preferable threshold may be on the order of thirty-three counts (i.e., 66% * 50=33 counts). Thus, step 32 compares the count from information counter 24 to the stored threshold. If the burden is less than the threshold, method 28 continues to step 34. On the other hand, if the burden is greater than or equal to the threshold, method 28 continues to step 36. Note further that the less than condition of step 32 is merely a matter of design choice, and could be changed to less than or equal to so that if the bus burden is equal to the threshold, method 28 continues to step 34 rather than step 36. In all events, method 28 then continues as described below.

Step 34 is reached when the burden on bus 32 (as reflected in the current example by way of a count of information units passing over a period of time) is lower than the threshold stored by prefetch controller 26. In this event, it is determined that the burden is acceptable such that the requested prefetch may occur. Consequently, in step 34 prefetch controller 26 performs the requested prefetch in any manner as is known in the prefetching art. Once the prefetch concludes, the flow returns to step 30 and awaits the next issuance of a prefetch request.

Step 36 is reached when the burden on bus 32 is greater than or equal to the threshold stored by prefetch controller 26. In this event, it is determined that the burden on bus 14 is already too high and, therefore, it is undesirable to further burden bus 14 with the requested prefetch. Consequently, in step 36 prefetch controller 26 at that time prohibits the requested prefetch from occurring. To accomplish this operation, prefetch controller 26 preferably includes a prohibit state which is reached in response to the comparison of the bus burden with the threshold. The state may be represented in various fashions, such as a state in a state machine or a flag such as a bit in a dedicated register. Indeed, such a state machine may be likely used to implement the present embodiments where the prefetch request is issued from a prefetch queue containing numerous prefetch requests. In any event, the bit or state in one instance prohibits the requested prefetch operation and the bit or state in an opposite instance permits the requested prefetch operation to occur. To simplify the remaining discussion, the example of setting this state by setting a prohibit flag will be used to indicate prevention of the prefetch operation, with it understood that a person skilled in the art may modify such discussions to apply to a state machine or other identifier used to provide the prohibit functionality. Thus, step 36 sets this prohibit flag so that the prefetch request at that point is prohibited from taking its affect and, therefore, the prefetch operation does not at this point occur. The manner of resetting the prohibit flag (or changing state from the prohibit state) however gives rise to various alternatives, each of which is described below as occurring after step 36.

After the request for prefetch has been prohibited in step 36 in response to the prohibit flag, step 38 of the present embodiment discards the prefetch request as it was issued from step 30 and thereafter resets the prohibit flag. As a result, the prefetch request no longer exists and the prohibit flag is reset such that it may be again set later with respect to a different prefetch request. Thereafter, the flow returns to step 30 and awaits issuance of a new prefetch request. Consequently, in the meantime, bus 14 is free to continue whatever activity it was then taking, or in the future will take, until a new prefetch request or some other activity requires use of the bus. Of course, in the event a new prefetch request is issued, it is again handled by method 28 in the above manner so as to either allow a prefetch operation to occur or to be prohibited based on a comparison of the bus burden with the stored threshold.

Figure 3B:
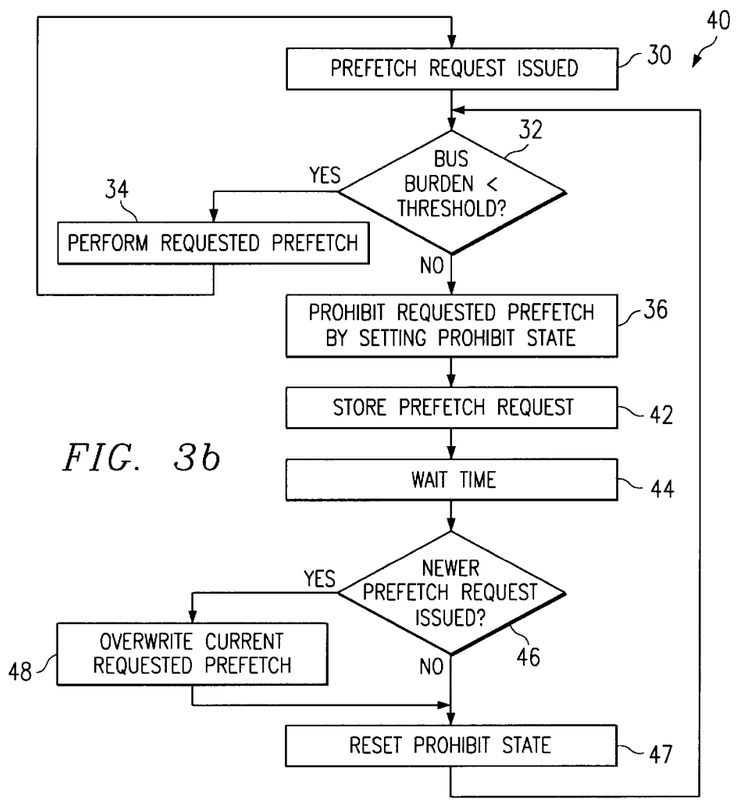
FIG. 3b illustrates a modification to the method of FIG. 3a such that a prefetch operation which is prohibited in a first instance is potentially permitted to occur at a later instance, if the burden of the memory bus has been reduced and no newer prefetch request has been received.

FIG. 3b illustrates a method 40 as an alternative to method 28 of FIG. 3a. In FIG. 3b, steps 30 through 36 are the same as in method 28 of FIG. 3a and, therefore, those reference numbers are carried forward to FIG. 3b and the reader is referred to the above discussion of those steps for detail as to their operation. Before turning to the alternative methodology of FIG. 3b, recall that step 36 occurs where prefetch controller 26 prohibits the requested prefetch from occurring at that time by setting the prohibit flag. Turning then to the alternative steps provided in FIG. 3b, the flow then continues to step 42. Step 42 stores a representation of the prefetch request in some storage device such as a register or the like, and which may be included in prefetch controller 26. Note, however, that step 42 does not reset the prohibit flag. Next, the flow continues to step 44 which waits some predetermined amount of time. For example, continuing with the example of an evaluation period of fifty clock cycles, step 44 may wait on the order of twenty-five clock cycles before proceeding to step 46. After the clock cycles of step 44 elapse, method 40 continues to step 46. Step 46 determines whether a newer prefetch request has been issued, that is, a prefetch request which was issued after the original prefetch request issued earlier in step 30. If no such newer prefetch request has been issued, the flow passes to step 47. On the other hand, if a newer prefetch request has been issued, the flow continues to step 48.

Given the above, step 47 is reached where an original prefetch request was once prohibited by step 36 but no newer prefetch request issued within the time frame determined by step 44. Step 47 resets the prohibit flag and the flow returns to step 32. The flow from step 32 then continues in the manner described above, again with respect to the earlier-issued prefetch request. Thus, once again step 32 compares the then-current burden on bus 14 to the threshold. Note at this point, however, that the burden may be different than it was in the earlier occurrence of step 32. Specifically, because of the elapsed time due to step 44, the now current burden on bus 14 may have fallen below the threshold. In this instance, the prohibit flag remains reset and step 32 passes flow to step 34 to allow the requested prefetch to occur. On the other hand, if the bus burden remains greater than (or equal to) the threshold, the flow again continues to steps 42 through 46, and this pattern may repeat numerous times until a newer prefetch request is issued.

If step 46 is reached and a newer prefetch request has issued, step 46 passes control to step 48. Step 48 overwrites the earlier prefetch request representation from step 42 with a representation of the newer prefetch request. The flow then continues to step 47 which, again, resets the prohibit flag, and then passes control to step 32 to proceed in the same manner as described above. Thus, in view of the newer prefetch request, step 32 compares the bus burden to the threshold, and either step 36 sets the prohibit flag if the then-current burden is unacceptably high or step 34 allows the prefetch operation to occur if the burden is acceptable (i.e., below the threshold).

In view of the above, one skilled in the art will appreciate that a first prefetch request may be prohibited from occurring various times as it repeatedly processes through steps 36 through 46. Thereafter, such a request will either ultimately be allowed to occur (i.e., if the bus burden falls below the threshold) or will eventually be superseded by a newer prefetch request. The newer prefetch request will then be processed in a like manner.

Figure 3C:
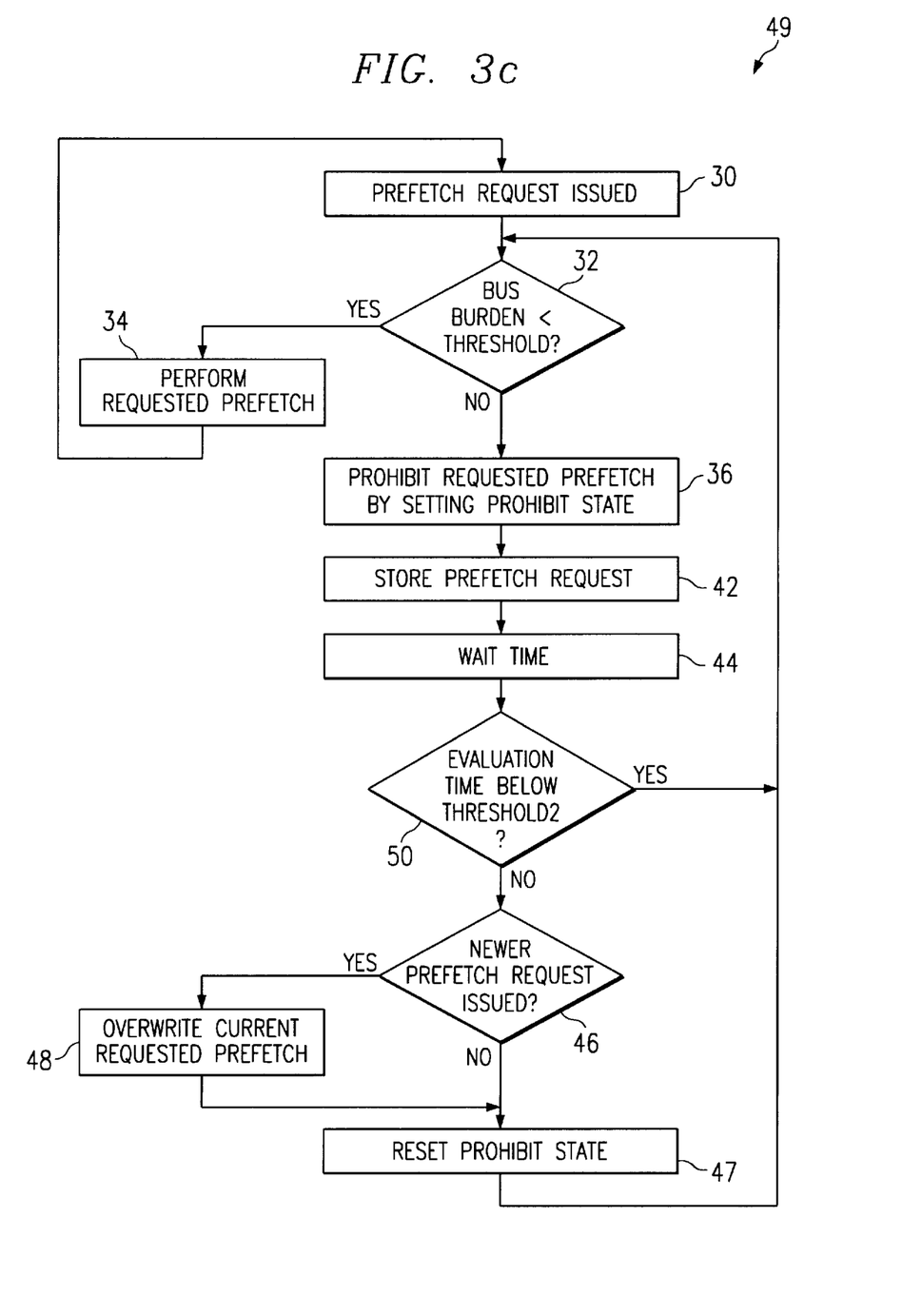
FIG. 3c illustrates a modification to the method of FIG. 3a such that a prefetch operation which is prohibited in a first instance is potentially permitted to occur at a later instance if the burden of the memory bus has been reduced and either a minimum amount of evaluation time has not been exceeded or no newer prefetch request has been received.

FIG. 3c illustrates a method 49 as an alternative to method 40 of FIG. 3b. In FIG. 3c, each step and flow are the same as in method 40 of FIG. 3b with the exception that an additional step 50 is added between steps 44 and 46. With respect to the remaining steps, therefore, the reference numbers of common steps are carried forward to FIG. 3c and the reader is referred to the above discussion of those steps for detail as to their operation. To demonstrate the difference of system 49, attention is directed to step 50.

Step 50 compares the time expended in evaluating the earlier-issued prefetch request with some threshold, shown as THRESHOLD2 in FIG. 3c (so as not to be confused with the threshold used in step 32). Thus, the first time a prefetch request passes from step 44 to step 52, the latter step will compare an evaluation time to THRESHOLD2. If the evaluation time is below THRESHOLD2, the flow returns to step 32. On the other hand, if the evaluation time is greater than or equal to THRESHOLD2, the flow continues to step 46 and proceeds in the same manner as from step 46 described above in connection with FIG. 3b (i.e., if no newer prefetch request has been received, the earlier-issued prefetch request is either allowed to occur, or prohibited, based on a comparison of the bus burden to the threshold in step 32). Given the variation provided from step 50 of method 49 in FIG. 3c, note therefore that it guarantees some minimum amount of time (as set by THRESHOLD2) for waiting for the bus burden to drop below the step 32 threshold for a given prefetch request. In other words, even if a newer prefetch request is issued, if THRESHOLD2 is not exceeded, the earlier issued prefetch request will be repeatedly analyzed from step 32 to step 44 and not overwritten by the newer prefetch request. In the meantime, the newer issued prefetch request, if any, may be either disregarded or placed in some temporary storage pending resolution of the earlier-issued prefetch request. On the other hand, once THRESHOLD2 is exceeded (or matched), the flow continues to step 46 to proceed in the manner as described above (or in an alternative manner as set forth below). Lastly, note further that step 50 in an alternative embodiment may compare the number of times the earlier-issued prefetch request was evaluated with a value stored as THRESHOLD2 so that if the number of evaluations is below THRESHOLD2 then the flow would return to step 32 (whereas if it did not, the flow would continue to step 46). In this latter alternative, THRESHOLD2 could be set as low as two so that step 50 would return flow for each request only once to step 32 or, alternatively, THRESHOLD2 could be set to a larger number to ensure some larger number of iterations.

Figure 3D:
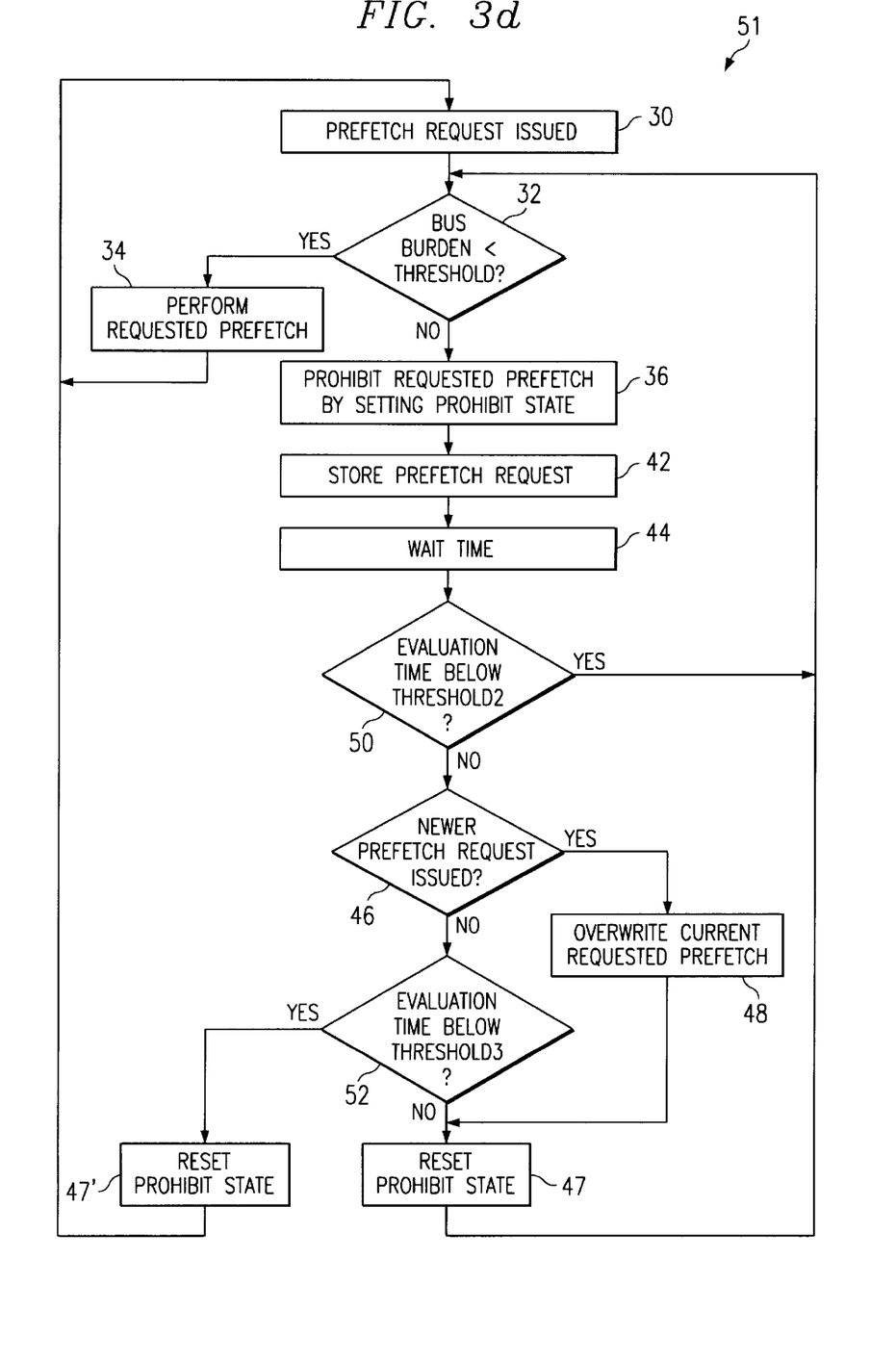
FIG. 3d illustrates a modification to the method of FIG. 3b such that a prefetch operation which is prohibited in a first instance is potentially permitted to occur at a later instance, if the burden of the memory bus has been reduced and no newer prefetch request has been received or, alternatively, if the prefetch request has been pending for some number of evaluations (or period of time), it is discarded regardless of whether a newer prefetch request has been received.

FIG. 3d illustrates a method 51 as an alternative to method 40 of FIG. 3b and method 49 of FIG. 3c. In FIG. 3d, each step and flow other than with respect to steps following step 50 are the same as in method 40 of FIG. 3b and, therefore, the reference numbers of common steps are carried forward to FIG. 3d and the reader is referred to the above discussion of those steps for detail as to their operation. To demonstrate the difference of system 51, attention is directed to step 46. Recall that step 46 occurs where prefetch controller 26 prohibits the requested prefetch from occurring and some time has elapsed due to the wait period from step 44. Again, step 46 determines whether a newer prefetch request has been issued. If a newer prefetch request has been issued, the flow continues to step 48 in the same manner as in method 40 of FIG. 3b such that the newer requested prefetch overwrites the earlier-issued prefetch, the prohibit flag is reset, and the newer requested prefetch issued is evaluated from step 32 forward. On the other hand, if no such newer prefetch request has been issued, the flow continues to step 52.

Step 52 compares the time expended in evaluating the earlier-issued prefetch request with some threshold, shown as THRESHOLD3 in FIG. 3d (so as not to be confused with the threshold used in step 32). Thus, the first time a prefetch request passes from step 46 to step 52, the latter step will compare an evaluation time to THRESHOLD3. If the evaluation time exceeds THRESHOLD3, the flow continues to a step designated 47', which is the same as step 47 in operation but passes control to a different step, namely, to step 30. On the other hand, if the evaluation time is less than or equal to THRESHOLD3, the flow continues to step 47 and proceeds in the same manner as from step 47 described above in connection with FIG. 3b (i.e., once again, the earlier-issued prefetch request is either allowed to occur, or prohibited, based on a comparison of the bus burden to the threshold in step 32). Note further that step 52 in an alternative embodiment may compare the number of times the earlier-issued prefetch request was evaluated with a value stored as THRESHOLD3 so that if the number of evaluations exceeds THRESHOLD3 then the flow would continue to step 47' (whereas if it did not, the flow would continue to step 47).

Given the variation provided from step 52 of method 51 in FIG. 3d, note now its operation in contrast to the prior embodiments. Specifically, if no newer prefetch request is incurred by step 46 and the evaluation time of the earlier-issued prefetch request is greater than THRESHOLD3, then method 51 passes through step 47' (to again reset the prohibit state) and returns to step 30. Thus, method 30 in this instance does not once again examine bus burden versus threshold for the earlier-issued prefetch request. Instead, by steps 52 and 47' transferring the flow to step 30 after an affirmative determination, method 51 will await the issuance of the next prefetch request rather than continuously re-evaluating with respect to the earlier-issued fetch request as in the manner of FIGS. 3b and 3c. For example, if THRESHOLD3 equals fifty clock cycles, then a prefetch request will be analyzed only up to forty-nine clock cycles before it is discarded and the method awaits issuance of a newer prefetch request.

Having now discussed various alternative embodiments given the structure and methodology set forth in FIGS. 1 through 3d, note that the inventive scope includes still additional embodiments. Moreover, many of the benefits of the above also may be achieved by the following additional examples of alternative embodiments. For example, recall that FIG. 1 illustrates different microprocessors and an I/O circuit accessing an external memory. Note now that each of the different microprocessors and/or circuits could be on the same integrated circuit and accessing a memory on that same integrated circuit, or accessing a memory external from the integrated circuit. Again, the two microprocessors would share a common bus which could be burdened by accesses using the bus and, therefore, the interface of each accessing device could monitor the burden of that bus and limit prefetching in a manner such as that set forth above. Still further, note that the aspect of bus monitoring and prefetch prohibition could apply to various levels within a single microprocessor, or multiple microprocessor system, where more than one circuit has access to the same bus and at least one circuit uses the bus for prefetching. For example, contemporary microprocessors often include various levels of storage, such as caches, between the register level and a higher level memory. Thus, selected ones, or all, of these levels could include circuitry for monitoring the burden of the bus connected to each level of storage, and to prohibit prefetching if the burden on such a bus exceeded a threshold. As still another example, prefetching of information could be either prefetched data or prefetched instructions. As yet a final example, while the methods of FIGS. 3a through 3d demonstrate various alternatives for evaluating successive prefetch requests, note further that it is preferable at the same time to evaluate whether the address of a current prefetch request corresponds to the address of an actual fetch address (i.e., an address of data or instructions immediately being fetched rather than speculatively being prefetched). In this event, the prefetch request may be immediately discarded in favor of the actual fetch operation. These as well as other alternatives may be appreciated by a person skilled in the art.

As another example of the flexibility of the present embodiments, note that the circuitry of FIG. 2 is shown by way of example to permit the functionality of the methods of FIGS. 3a through 3d. Thus, a person skilled in the art could fashion various alternatives to perform such functionality. For example, the count of fifty described above could be set at other levels. As another example, the level of the threshold could be adjusted as well. Moreover, the threshold itself could be established in many manners, such as a fixed value, a value set by an instruction at the instruction set architecture level, a value set by an operating system, or a value set by microcode or some other substructure which is not apparent or alterable at the architectural level. Indeed, by having changeable thresholds, the threshold may be altered for different events causing a prefetch. As yet another example, since the state of the prohibit flag ultimately controls whether a prefetch is permitted to occur, note in an alternative embodiment that this flag may be altered by other events; for example, an instruction at the instruction set architecture level may be issued to merely set the flag, thereby prohibiting prefetching regardless of bus burden. As still another example, recall from above that information identifier 20 may further discern the type of information, if any, on bus 14. Thus, certain types of information may be excluded from the burden count; for example, prefetches along bus 14 may be identified by information identifier 20 (as such events typically include a tag identifying them as prefetches) and could be excluded from the count such that they did not indicate a burden on the bus (i.e., information identifier 20 would not assert its control output if the information on bus 14 were the result of another prefetch operation). As yet another example, circuits other than counting upward could be implemented to evaluate the burden on the relevant bus, such as a circuit which increments or decrements over time in response to whether an information unit is passing along the bus during each clock cycle. Still other examples will be ascertainable by a person skilled in the art.

Figure 4:
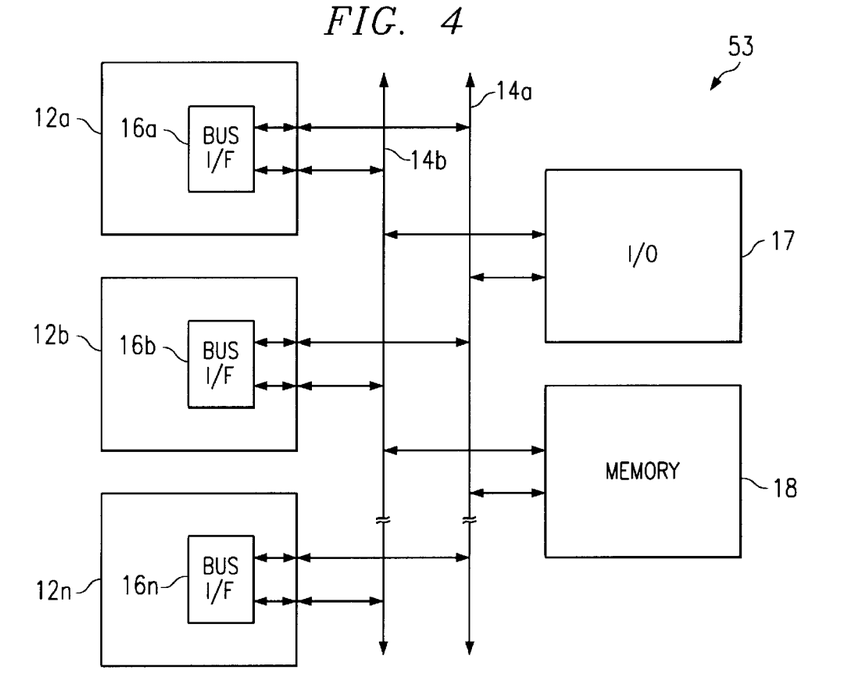
FIG. 4 illustrates the block diagram of FIG. 1 wherein the system components may communicate along multiple buses.
Figure 5:
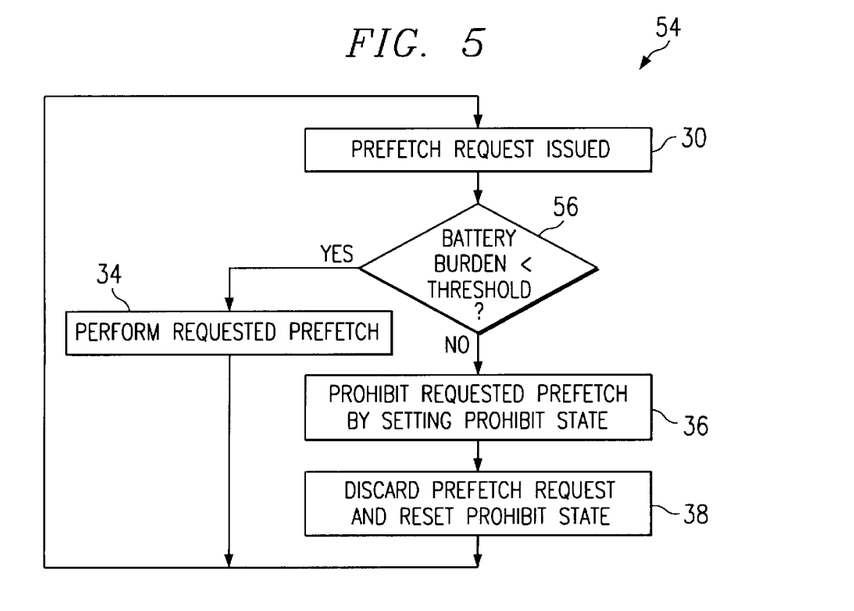
FIG. 5 illustrates a method of operation of a battery powered microprocessor system to selectively permit or prohibit prefetching based on the burden on the battery power supply.

FIG. 4 illustrates a system 53 as an alternative to system 10 of FIG. 1. In FIG. 4, each of the blocks is the same as in FIG. 1 and, therefore, common reference numbers are carried forward to FIG. 4 and the reader is referred to the above discussion of those steps for detail as to their operation. In the alternative of FIG. 4, however, bus 14 of FIG. 1 is replaced with two separate buses designated bus 14a and bus 14b. By a comparison of FIGS. 1 and 4 therefore, note that each block within system 53 may communicate in the same manner as system 10 (of FIG. 1), with the addition however that each block may perform such communication via one of two buses, namely, either bus 14a or bus 14b. Consequently, the above embodiments may be further modified to accommodate such a system as described below.

Given the configuration of system 53, at least two alternative embodiments arise for applying the above teachings to such a system. In a first such embodiment, each of buses 14a and 14b is treated as a single bus such as bus 14 above. Thus, returning briefly to FIG. 2, each block therein may be duplicated, with a first set of blocks as shown applying to bus 14a, and with a second set of blocks as shown applying to bus 14b. Thus, each bus 14a and 14b is separately monitored and accessed based on a comparison of a threshold for that bus with the burden for that bus. Moreover, each bus may be then analyzed according to any one of the various methods shown in FIGS. 3a through 3d. In a second embodiment, however, buses 14a and 14b may be combined in the sense of analysis under the present teachings. More specifically, the burden of each bus could be combined, and compared to a threshold which also is combined for the two buses. For example, recall above that a burden between zero and fifty was provided over a period of analysis, and a threshold of thirty-three. If buses 14a and 14b were combined for purposes of analysis using such an example, then the total burden would be between zero and one hundred, and the threshold would be sixty-six. In the event that a prefetch were permitted to occur (i.e., the burden was less than or equal to the threshold), such a prefetch could be allowed then to communicate over either bus 14a or bus 14b. Still other variations will be ascertainable by a person skilled in the art, particularly in view of varying bus architectures and the possibility for yet an additional number of buses.

In addition to the many examples of inventive scope set forth above, the present inventors further appreciate that prefetching may burden computer systems in manners other than bus activity. Again, prefetching is generally speculative and, therefore, it may be desirable to limit it when the burden it creates surpasses what is justifiable given other resources in a system configuration. Thus, the methods of FIGS. 3a through 3d may be further modified to accommodate such systems. For example, many current computers are powered by battery power supplies, such as so-called laptop and notebook computers. In the instance of such computers, it is desirable to improve power efficiency so that the power supply (typically rechargeable) lasts a greater amount of time. Therefore, various techniques have arisen to reduce power consumption in these types of computers. Power consumption techniques also arise in the context of the combination of portable computers and desktop computers in so-called docking bay configurations, particularly in instances where the portable computer is removed from the dock thereby changing the power consumption considerations. In the context of the present embodiments, therefore, prefetching may be limited by evaluating the then-existing power level as the resource which may be overburdened so as to justify prohibiting a prefetch operation. In this regard, FIG. 4 illustrates a method designated generally at 54, which is identical to method 28 of FIG. 3a with the exception that a step 56 is substituted for step 32 of FIG. 3a. Turning then to step 56, it is again reached once a prefetch request has been issued. In step 56, the current battery power is ascertained and compared to a threshold. Techniques for determining current battery power are well known in the art. If the current battery power exceeds the threshold, the flow continues to step 34 to perform the requested prefetch. On the other hand, if the current battery power is lower (or equal to) the threshold, the flow continues to step 36 to prohibit the requested prefetch. Therefore, one skilled in the art will appreciate that prefetching is limited when it could otherwise overburden a system resource, and that system resource is battery power in the example of FIG. 4. Note further that many of the alternatives described above also apply to FIG. 4, such as either discarding the prefetch request or re-evaluating the system resource burden at a later time to determine if the burdened resource has been sufficiently relieved to allow the requested prefetch to occur.

From the above, one skilled in art may appreciate numerous benefits of the present embodiments. For example, the various embodiments may be implemented in either single or multiple microprocessor systems. In either event, the present embodiments may limit prefetching in instances where a system resource burden is determined to be too large, while permitting prefetching, and thereby realizing its benefits, where the burden it will impose on the system is acceptable. In addition, the above demonstrates various alternative embodiments included within the inventive scope. For example, two types of system burdens are discussed by way of example, those including bus activity or the level of available power for a system; however, various other system burdens are contemplated and are ascertainable by a person skilled in the art. As another example, the techniques for measuring the burden and setting a threshold are also flexible as shown by the various examples above. As still another example of the flexibility of the present embodiments, one skilled in the art is able to construct various different specific circuits to accomplish the above features and functionality. Indeed, these benefits and examples serve further to demonstrate that while the present embodiments have been described in detail, various substitutions, modifications or alterations could be made to the descriptions set forth above without departing from the inventive scope. Still further, in addition to the many options set forth above still other alternatives will be ascertainable by a person skilled in the art, and all of the above demonstrates the flexibility of the inventive scope which is defined by the following claims.

What is claimed is:

1. A computer system, comprising:

a memory;

circuitry for prefetching information from said memory in response to a prefetch request;

a system resource, wherein said system resource is burdened in response to a prefetch operation by said circuitry for prefetching information and is further burdened in response to other circuitry using said system resource;

circuitry for determining a measure of said burden on said system resource; and circuitry for prohibiting prefetching of said information by said circuitry for prefetching information responsive to a comparison of said measure of said burden with a threshold; and wherein said circuitry for prefetching information from said memory comprises a microprocessor;

wherein said system resource comprises a bus coupling said memory to said microprocessor;

wherein said burden on said system resource comprises information units passing along said bus;

wherein said circuitry for determining a measure of said burden on said system resource comprises circuitry for determining a measure of said information units passing along said bus; and wherein said circuitry for prohibiting prefetching of said information comprises circuitry for prohibiting prefetching of said information by said microprocessor responsive to a comparison of said measure of said information units passing along said bus with said threshold; and wherein said circuitry for determining a measure of information units passing along said bus comprises circuitry for monitoring a number of all information quantities passing along said bus over a period of time other than information units passing along said bus in response to a prefetch activity.

2. A computer system, comprising:

a memory;

circuitry for prefetching information from said memory in response to a prefetch request;

a system resource, wherein said system resource is burdened in response to a prefetch operation by said circuitry for prefetching information and is further burdened in response to other circuitry using said system resource;

circuitry for determining a measure of said burden on said system resource; and circuitry for prohibiting prefetching of said information by said circuitry for prefetching information responsive to a comparison of said measure of said burden with a threshold; and wherein said circuitry for prefetching information from said memory comprises a microprocessor;

wherein said system resource comprises a bus coupling said memory to said microprocessor;

wherein said burden on said system resource comprises information units passing along said bus;

wherein said circuitry for determining a measure of said burden on said system resource comprises circuitry for determining a measure of said information units passing along said bus; and wherein said circuitry for prohibiting prefetching of said information comprises circuitry for prohibiting prefetching of said information by said microprocessor responsive to a comparison of said measure of said information units passing along said bus with said threshold;

wherein said circuitry for prohibiting prefetching of said information by said microprocessor responsive to a comparison of said measure of said information units passing along said bus with a threshold comprises circuitry for performing said comparison at a first time; and wherein said circuitry for prohibiting prefetching further comprises circuitry for comparing said measure of said information units passing along said bus with said threshold at a second time later than said first time in response to prohibiting prefetching at said first time.

3. The computer system of claim 2 wherein said circuitry for determining a measure of information units passing along said bus comprises circuitry for monitoring a number of all information units passing along said bus over a period of time.

4. The computer system of claim 2 wherein said circuitry for prohibiting of said information by said microprocessor responsive to a comparison of said measure of activity with a threshold comprises a prohibit flag representative of whether prefetching should be prohibited.

5. The computer system of claim 4 and further comprising:

circuitry for storing a value representative of said measure of said information units passing along said bus;

circuitry for storing a value representative of said threshold; and wherein said prohibit flag is set in response to a comparison of said value representative of said measure of said information units passing along said bus with said value representative of said threshold.

6. The computer system of claim 5 wherein said prohibit flag is operable to alternatively be set in response to a value included in an instruction set architecture instruction.

7. The computer system of claim 2:

wherein said microprocessor comprises a first microprocessor;

and further comprising a second microprocessor; and wherein each of said first and second microprocessor are located on a single integrated circuit.

8. The computer system of claim 2:

wherein said micoprocessor comprises a first microprocessor;

and further comprising a second microprocessor;

wherein said first microprocessor is located on a first integrated circuit; and wherein said second microprocessor is located on a second integrated circuit different than said first integrated circuit.

9. The computer system of claim 2:

wherein said microprocessor comprises a first microprocessor;

and further comprising a second microprocessor; and wherein said burden on said system resource comprises information units passing along said bus in response to said second microprocessor.

10. The computer system of claim 2:

wherein said system resource further comprises a battery power supply for supplying power to said microprocessor;

wherein said burden on said system resource further comprises a power level of said battery power supply;

wherein said circuitry for determining a measure of said burden on said system resource comprises circuitry for determining a measure of said power level of said battery power supply; and wherein said circuitry for prohibiting prefetching of said information comprises circuitry for prohibiting prefetching of said information by said microprocessor responsive to a comparison of said measure of power level of said battery power supply with said threshold.

11. The computer system of claim 2 wherein said information comprises instruction information.

12. The computer system of claim 2 wherein said information comprises data information.

13. A computer system, comprising:

a memory;

circuitry for prefetching information from said memory in response to a prefetch request;

a system resource, wherein said system resource is burdened in response to a prefetch operation by said circuitry for prefetching information and is further burdened in response to other circuitry using said system resource;

circuitry for determining a measure of said burden on said system resource; and circuitry for prohibiting prefetching of said information by said circuitry for prefetching information responsive to a comparison of said measure of said burden with a threshold; and wherein said circuitry for prefetching information from said memory comprises a microprocessor;

wherein said s resource comprises:

a first bus coupling said memory to said microprocessor; and a second bus coupling said memory to said microprocessor;

wherein said burden on said first bus comprises information units passing along said first bus and said burden on said second bus comprises information units passing along said second bus;

wherein said circuitry for determining a measure of said burden on said first bus comprises circuitry for determining a measure of said information units passing along said first bus and said circuitry for determining a measure of said burden on said second bus comprises circuitry for determining a measure of said information units passing along said second bus circuitry for adding the measure of said information units passing along said first bus to the measure of information units passing along second bus yielding a summed measured; and wherein said circuitry for prohibiting prefetching of said information comprises circuitry for prohibiting prefetching of said information by said microprocessor responsive to a comparison of said summed measure of said information units passing along said fist and second buses with said threshold.

* * * * *